United States Patent [19]

Bergström

[11] Patent Number: 4,591,606

[45] Date of Patent: May 27, 1986

[54] POLYOLEFIN FOAM FOAMED WITH WATER AND CROSS-LINKED WITH SILANE, AND PROCEDURE FOR ITS MANUFACTURING

[75] Inventor: Christer Bergström, Helsinki, Finland

[73] Assignee: Neste Oy, Finland

[21] Appl. No.: 740,843

[22] PCT Filed: Oct. 24, 1984

[86] PCT No.: PCT/FI84/00079

§ 371 Date: May 22, 1985

§ 102(e) Date: May 22, 1985

[87] PCT Pub. No.: WO85/01944

PCT Pub. Date: May 9, 1985

[30] Foreign Application Priority Data

Nov. 4, 1983 [FI] Finland .................. 834062

[51] Int. Cl.$^4$ .............................. C08J 9/12
[52] U.S. Cl. ............................ 521/79; 264/53; 521/82; 521/86; 521/88; 521/92; 521/93; 521/96; 521/143; 521/154; 521/910
[58] Field of Search ............ 521/143, 154, 149, 82, 521/86, 92, 910, 79, 88, 96

[56] References Cited

U.S. PATENT DOCUMENTS

| | | | |
|---|---|---|---|
| 4,160,072 | 7/1979 | Shinkai et al. | 521/96 |
| 4,252,906 | 2/1981 | Hosokawa et al. | 521/154 |
| 4,333,898 | 6/1982 | Schmidtchen | 521/79 |
| 4,413,066 | 11/1983 | Isaka et al. | 521/149 |
| 4,456,704 | 6/1984 | Fukumura et al. | 521/79 |

FOREIGN PATENT DOCUMENTS

| | | |
|---|---|---|
| 57-149338 | 9/1982 | Japan . |
| 398886 | 1/1978 | Sweden . |
| 1408154 | 10/1975 | United Kingdom . |
| 1541271 | 2/1979 | United Kingdom . |
| 1575961 | 10/1980 | United Kingdom . |

OTHER PUBLICATIONS

Chemical Abstracts, vol. 93 (1980), No. 240,562y, JP 8094940.

*Primary Examiner*—Morton Foelak
*Attorney, Agent, or Firm*—Steinberg & Raskin

[57] ABSTRACT

The present invention concerns a foamed, silane-cross-linked polyolefin foam and a procedure for producing the same. The polyolefin foam contains 60–99.9% polyolefin, 0.1–10% chemically bound hydrolyzed silane, 0–5% condensing catalyst, 0.1–5% water and 0–20% water carrier substance. The polyolefin foam is produced by extruding a mixture which contans polyethylene, silane hydrolyzable with water, a condensing catalyst and a foaming agent. For the polyolefin to be extruded is used polyethylene containing 0.1–5% water as foaming agent and 0–20% water carrier substance.

7 Claims, No Drawings

POLYOLEFIN FOAM FOAMED WITH WATER AND CROSS-LINKED WITH SILANE, AND PROCEDURE FOR ITS MANUFACTURING

BACKGROUND OF THE INVENTION

The present invention concerns a cross-linked polyolefin foam which has been foamed with water and cross-linked by hydrolysing and condensing silyl groups on the polyolefin.

Cross-linked polyolefin foam is presently produced by using chemical foaming agents, such as azodiacarbonamide, which decompose on being heated and generate gaseous nitrogen. The cross-linking is usually achieved by the aid of a radical former, such as dicumylperoxide. The cross-linking reaction is also achieved with the aid of heat. Cross-linked polyethylene foam manufacturing processes have also been developed, but in their case cross-linking is accomplished with the aid of irradiation. The above-mentioned products have very low densities, for which reason no applications requiring strength and rigidity can be contemplated. When an organic peroxide is used as a cross-linking agent, control of the process is difficult because foaming and cross-linking process, are both temperature-dependent. Endeavours are, as a rule, to proceed so that when being foamed the polyethylene is partly cross-linked because in this way a more uniform foam is obtained. The above-mentioned processes require extra apparatus after the extruder for cross-linking and foaming.

Polyethylene is also cross-linked by grafting to it an unsaturated alkoxysilane and by hydrolysing and condensing silyl groups by treating the end product with hot water or steam, with the aid of a condensing catalyst. Nowadays, polyethylene that is cross-linkable in this way is available in the form of two mix components, one of them containing grafted alkoxysilane and the other containing condensation catalyst. These granulates are mixed prior to extrusion and the end product is cross-linked with hot water or steam in a separate process step. Also other silane cross-linking processes exist, which differ somewhat from the process just described. In one process, all raw materials are supplied directly into the extruder at the step in which the end product is being manufactured. A separate cross-linking step is required in this case too.

It is true that foam cross-linked with silane is being produced to some extent, but all these processes use azodicarbonamide as foaming agent, and cross-linking takes place by treating the end product with hot water or steam.

SUMMARY OF THE INVENTION

The invention concerns foamed polyolefin foam cross-linked with silane for which no cross-linking step performed afterwards is necessary. The silane-cross-linked polyolefin foam of the invention is characterised in that it contains 60–99.9% polyolefin, 0.1–10% chemically bound hydrolysed silane, 0–5% condensation catalyst, 0.1–5% water, and 0–20% water carrier substance.

The invention also concerns a new procedure for manufacturing foamed, silane-cross-linked polyolefin foam. The procedure of the invention is characterized in that for polyolefin to be extruded, polyethylene is used which contains, as foaming agent, 0.1–5% water, and 0–20% water carrier substance.

DESCRIPTION OF THE PREFERRED EMBODIMENTS

The polyolefin according to the invention to be foamed and cross-linked may be any polyolefin (LDPE, LLDPE, HDPE, PP, etc., or their copolymers or mixtures), and the foaming agent may be any water-containing substance which is miscible with and dispersible in molten polyolefin (a compound containing crystal water, such as $CaSO_4.H_2O$, $CaSO_4.\frac{1}{2}H_2O$ and $Al_2O_3.3H_2O$, or water-absorbing compound, such as $CaCl_2$ and artificial silica, or a water-solving substance miscible with the polyolefin, such as ethylene glycol, propylene glycol, polyethylene glycol and polypropylene glycol). For silane any unsaturated hydrolysable silane which can be grafted to the polyolefin chain or copolymerised with the polyolefin by a radical reaction (by organic peroxide, electron irradiation or other means) may be used. Silyl peroxides may also be used towards this end.

The aim is, independent of the mode of adding foaming agent, silane or organic peroxide, that the molten polyolefin emerging from the extruder should contain 0.1–10%, preferably 0.5–3%, $CaSO_4.2H_2O$ or an organic or inorganic additive containing an equivalent quantity of water, 0–10%, preferably 0.5–3%, vinyltrimethoxysilane (VTMO) or an equivalent quantity of other silyl groups, and 0–5%, preferably 0.02–0.1%, dicumylperoxide (DCP) or an equivalent quantity of radicals produced in another way. Furthermore there may be added 0–5%, preferably 0.05–0.5%, dibutylstannic dilaurate (DBTL) or of an equivalent hydrolyzing and condensing catalyst, such as Zn stearate.

If the additives are ready-mixed with the polyolefin as a compound, the contents stated above apply. If however the additives are added in the form of master batches, the $CaSO_4.2H_2O$ content may be up to 70% and dicumylperoxide may be 10%, and dibutylstannic dilaurate may be 10%. A typical two-component system may be: Compound I; LDPE containing 2% vinyltrimethoxysilane; Compound II; LDPE containing 20% $CaSO_4.2H_2O$ + 20% carbon black + 1% dicumylperoxide + 1% dibutylstannic dilaurate.

The cross-linked foam, which in this case is fairly hard and rigid, is appropriate either as such or together with a non-foamed plastic layer, or layers, to be used in cable manufacturing, tube manufacturing, as jacket material (e.g. of an area heating pipe) and in mould blowing (big LDPE canisters e.g. for chemicals). In these instances, material savings are achieved as regards the polyolefin raw material, and properties of the cross-linked polyolefin (heat tolerance, cold tolerance, tolerance of chemicals, and resistance to stress cracking). The adhesion to metal is also good (owing to the silane). It is possible to use less carbon black in the foamed product. Film products may be foamed and cross-linked by this procedure in order to obtain a strong, breathing (holes) film with high friction. It is also possible to produce strong and soft film for packaging purposes (soft and tough at low temperatures). The adhesion properties of silane may be utilized in coextrusion with other types of plastics. In extrusion coating, the friction and adhesion characteristics of foam produced in this manner could be utilized. By the die-casting technique, cross-linked products may be manufactured, in which case the degree of foaming and the degree of cross-linking can be regulated by regulating the die pressure and the temperature cycling. Cross-linked foam products may be manufactured by a rotation casting process, in addition to the technique mentioned. These products may also be manufactured by foaming with water and cross-linking using other procedures (organic peroxide, electron radiation, etc.), or they may be left un-cross-linked (omitting the silane). In that case, naturally, the advantageous foaming, machinability, adhesion and strength properties resulting from silane will not be achieved.

Deviating from procedures known in the art, in the procedure of the invention the water needed for hydrolysis and condensation of silane is added to the polyolefin raw material in connection with extruding the end product, whereby it can be mixed with the granulate or supplied at a later stage directly into the molten polyolefin. The water may also be ready-mixed in the plastic raw material (compound). When water is added in this manner to plastic, it must as a rule be mixed with another substance which is well miscible with the polyolefin (e.g. propylene glycol), or the water may be physically or chemically bound to such a substance (e.g. in the form of crystal water). If the water is added in a polyolefin master batch, it has to be prepared at a temperature so low that the compound has not undergone foaming. With water present in this way when the polyolefin is molten, the silane that has been grafted or is present as a co-monomer begins to hydrolyse and to condense partly at the extrusion step already. In this way, the foaming starting after the extrusion orifice takes place in a partly cross-linked and elastic polyolefin melt. The advantage is then that the foam is more uniform and the density is lower. Also the molten strength is higher, thus facilitating the shaping of the end product (e.g. in mold blowing). The shrinkage (increase in density) of the foam in connection with the cooling of the end product is also reduced in this way. The most important advantage is however that the hydrolysis and condensation of silane has already been able to start in the extruder in the foaming step, and the cross-linking reaction will then continue of itself without any separate cross-linking step. The product need only be stored in normal storage conditions. It is also important that cross-linking starts on the cell walls at an early stage.

All additive components may be added as is into the extruder together with the polyolefin granulate or powder, or at a later stage into the polyolefin melt. But it is easier to use a ready-made polyolefin compound which contains all, or part of, the above-mentioned components. If all additive components are included in the same compound, it has to be prepared at very low temperature (below the foaming temperature and preferably below the decomposition temperature of peroxide). This is because of the aim of not yet grafting the silane in connection with the compound prepartion, but only at the processing step. In this way, the compound has a longer shelf life. As taught by the invention, however, the silane may also be grafted in connection with the compound preparation. Another alternative is that two compounds are used, Compound I, which contains the silane and which may be prepared at high temperature and with high production rate, and Compound II, which contains the foaming agent and the organic peroxide and which must be prepared at lower temperature and, for this reason, at low production speed. The other requisite components, such as carbon black, may be admixed with either component. In this way, according to application and to what is needed the degree of foaming and degree of cross-linking can be regulated. Compound I and Compound II may, as required, also be diluted with the basic polyolefin.

In conjunction with extrusion of the end product, conditions must be such that the steam and/or the silane cannot escape through the rear. There must be a plug of molten plastic in the extruder, and at the decomposition temperature of the foaming agent the temperature must be high enough so that no foaming occurs in the extruder. It must also be possible to regulate the temperatures and delay times so that the silane is completely grafted in the extruder and that hydrolysis and condensation of silane are partly accomplished. The foaming and the condensation proper of the silane only take place after the extruder. It is then advantageous if the polyolefin melt has high viscosity (low melt index, low temperature, high degree of cross-linking, etc.), whereby the melt strength is high.

At the beginning, cooling must be between the water condensing temperature and the crystallizing temperature of the polyolefin, whereby a lighter foam and more efficient silane condensation are obtained.

The idea of manufacturing polyolefin foam foamed with water and cross-linked with silane is illustrated by means of the following examples. Strips were run of the following formulations as dry mixes with a Reifenhäuser strip extruder (45 mm, 25 L/D) in such manner that the temperature profile was 105° C., 125° C., 180° C., 180° C., T°C., T°C. The orifice temperature (T) was normally 190° C., the screw speed (V), 40 min$^{-1}$, and the foamed, cross-linked strip material was air-conditioned during one week at 23° C., at 50% R.H., before testing.

EXAMPLE 1

A polyethylene mix was prepared which contained common low density polyethylene (melt index 0.3 g/10 min) and 0-2% by weight gypsum (CaSO$_4$.2H$_2$O). The density of the mixture was 0.92 g/cm$^3$.

From the mixture, a strip was produced in a strip extruder (45 mm, 25 L/D) in such manner that the temperature profile was 105°, 120°, 180°, 190°, 190° C. The screw speed was 40 min$^{-1}$. The foamed polyethylene strip was air-conditioned during one week at 23° C. and at 50% R.H. prior to testing. In Table I are stated the product recipes and the characteristics that were found by measurement.

It is evident from Table I that when the quantity of gypsum increases the density of the polyethylene foam which is produced goes down, while at the same time the elongation and tensile impact strength deteriorate substantially. If on the other hand the absolute values of the specimens (not standardized with reference to cross-section area) are observed, there is no substantial lowering.

EXAMPLE 2

As in Example 1, foamed polyethylene strips were run from mixtures containing 1% by weight vinyltrimethoxysilane, 0.1% by weight dicumylperoxide, and 0-0.1% by weight dibutylstannic dilaurate. The recipes and the characteristics of the product are presented in Table II.

Table II reveals how cross-linking with silane improves the tensile impact strength values and, furthermore, reduces the density. When too much silane is added (3%), the density increases again because the silane consumes too much of the water produced by the gypsum. The degree of cross-linking does not increase substantially however (about 30%).

EXAMPLE 3

As in Example 1, polyethylene foam strips were produced in a strip extruder from a mixture containing 1.5–3% by weight gypsum as foaming agent. The cross-linking agent was vinyltrimethoxysilane (2%). In Table III are presented the recipes that were used and the characteristics measured for the products.

Table III reveals that when the silane content is constant (2%) the density first decreases but then increases again. The degree of cross-linking, on the other hand, first increases with decreasing gypsum content, to go down once more thereafter. Lowest density and highest degree of cross-linking are obtained when the gypsum content is 1.5% by weight.

EXAMPLE 4

As in Example 1, polyethylene foams were produced in a strip extruder. The cross-linking agent was vinyl-tris(betamethoxyethoxy)silane and vinyltrimethoxysilane. The foaming agent was gypsum, calcium chloride and 1:1 propylene glycol:water solution. The recipes and the characteristics of the products are presented in Table IV.

In Table IV is seen the effect of silane type and foaming agent type on the characteristics of the LDPE foam. VTMOEO yields higher degrees of cross-linking than VTMO, but this may be due to the lower building point of the latter, and it may escape in greater amount during the extrusion step. Using $CaCl_2$ or 1:1 water/propylene glycol solution for foaming agent, cross-linked foam is certainly obtained, but the densities are rather high and the degrees of cross-linking rather low.

EXAMPLE 5

In this example the effect of melt index, density (HDPE) and carbon black (2.5%) on the properties of the cross-linked polyethylene foam were examined, said properties being shown in Table V. It is observable that when high melt index LDPE is used (SI=7.5 g/10 min) the density of the foam does not go down enough. The melt strength of the foam is too low. The degrees of cross-linking are, however, fairly high. With HDPE, again, relatively low desities can be achieved, but the degree of cross-linking remains rather low. Regarding polyethylene containing carbon black it may be said that the foam is impaired both as regards density and cross-linking. Carbon black absorbs part of the water, silane, peroxide and condensing catalyst. This must be taken into account when the recipe is optimized.

EXAMPLE 6

In this example, the effect of extrusion conditions on density and degree of cross-linking was studied. In Table VI the effect of the foam-solidifying technique on the results is also shown, in that the foam has been allowed to recrystallize in boiling water, whereby the water in the cells has been in vapour form during crystallization and cross-linking of the polyethylene. In this manner, clearly lower densities and slightly higher degrees of cross-linking were obtained. In Table VI it is seen that when a lower melt temperature is used a lower density is obtained, but also a slightly lower degree of cross-linking is obtained. For the delay time an optimum also exists (in the present instance, 40 $min^{-1}$). When the delay time is too short, the silane has not time to become grafted and condensed, and when the delay time is too long, the silane evaporates before grafting. When there is too much condensing catalyst (0.2% DBTL) and reactive components in sufficient quantity (2% gypsum and 2% VTMO), the cross-linking reaction may be so violent that the polyolefin emerges from the extruder in powder form. The degree of cross-linking is then very high (76%) By reducing the delay time in the extruder by increasing the r.p.m. of the screw, the cross-linking reaction can be prevented from running this far.

TABLE 1

| | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (kJ/m$^2$) |
|---|---|---|---|---|---|---|---|---|---|---|---|
| 1 | LDPE, S1* - 0.3 | 0 | 0 | 0 | 0 | 0.92 | 0 | 12 | 310 | 125 | 327 |
| 2 | " | 0.5 CaSO$_4$.2H$_2$O | 0 | 0 | 0 | 0.87 | 0 | 12 | 114 | 110 | 135 |
| 3 | " | 1.0 CaSO$_4$.2H$_2$O | 0 | 0 | 0 | 0.64 | 0 | 7 | 70 | 74 | 51 |
| 4 | " | 2.0 CaSO$_4$.2H$_2$O | 0 | 0 | 0 | 0.58 | 0 | 4 | 10 | 52 | 19 |

TABLE II

| | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (KJ/m$^2$) |
|---|---|---|---|---|---|---|---|---|---|---|---|
| 5 | LDPE, S1 - 0.3 | 1.0 CaSO$_4$.2H$_2$O | 0 | 0.1 | 0 | 0.59 | 1 | 5 | 50 | 66 | 48 |
| 6 | " | 1.0 CaSO$_4$.2H$_2$O | 1 VTMO | 0.1 | 0.1 | 0.59 | 33 | 5 | 140 | 62 | 41 |
| 7 | " | 1.0 CaSO$_4$.2H$_2$O | 2 VTMO | 0.1 | 0.1 | 0.61 | 34 | 5 | 105 | 60 | 45 |
| 8 | " | 1.0 CaSO$_4$.2H$_2$O | 3 VTMO | 0.1 | 0.1 | 0.80 | 36 | 5 | 40 | 57 | 97 |

TABLE III

| | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (kJ/m$^2$) |
|---|---|---|---|---|---|---|---|---|---|---|---|
| 9 | LDPE, S1 - 0.3 | 1.5 CaSO$_4$.2H$_2$O | 2 VTMO | 0.1 | 0.1 | 0.52 | 53 | 4 | 55 | 43 | 22 |
| 10 | " | 2.0 CaSO$_4$.2H$_2$O | 2 VTMO | 0.1 | 0.1 | 0.63 | 61 | 4 | 40 | 44 | 17 |
| 11 | " | 2.5 CaSO$_4$.2H$_2$O | 2 VTMO | 0.1 | 0.1 | 0.77 | 42 | 5 | 20 | 66 | 29 |

TABLE III-continued

|    | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (kJ/m$^2$) |
|----|---------|-------------------|------------|---------|----------|--------------------|-----------------------------|------------------------|----------------|------------------------------|------------------------------------|
| 12 | "       | 3.0 CaSO$_4$.2H$_2$O | 2 VTMO  | 0.1     | 0.1      | 0.83               | 39                          | 6                      | 10             | 76                           | 50                                 |

TABLE IV

|    | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (kJ/m$^2$) |
|----|---------|-------------------|------------|---------|----------|--------------------|-----------------------------|------------------------|----------------|------------------------------|------------------------------------|
| 13 | LDPE, S1 - 0.3 | 1.0 CaSO$_4$.2H$_2$O | 2 VTMOEO** | 0.1 | 0.1 | 0.79 | 68 | 11 | 400 | 131 | 54 |
| 14 | " | 2.0 CaSO$_4$.2H$_2$O | 2 VTMOEO** | 0.1 | 0.1 | 0.66 | 59 | 7 | 50 | 75 | 57 |
| 15 | " | 1.0 CaCl$_2$ | 2 VTMO | 0.1 | 0.1 | 0.71 | 26 | 4 | 95 | 61 | 42 |
| 16 | " | SO I H$_2$O SO I propylene glycol | 2 VTMO | 0.1 | 0.1 | 0.72 | 21 | 3 | 82 | 58 | 48 |

TABLE V

|    | Quality | Foaming agent (%) | Silane (%) | DCP (%) | DBTL (%) | Density (g/cm$^3$) | Degree of cross-linking (%) | Tensile strength (MPa) | Elongation (%) | Modules of elasticity (MPa) | Tensile impact strength (kJ/m$^2$) |
|----|---------|-------------------|------------|---------|----------|--------------------|-----------------------------|------------------------|----------------|------------------------------|------------------------------------|
| 17 | LDPE, S1 - 7.5 | 1.0 CaSO$_4$.2H$_2$O | 2 VTMO | 0.1 | 0.1 | 0.80 | 45 | 8 | 10 | 103 | 155 |
| 18 | LDPE, S1 - 7.5 | 2.0 CaSO$_4$.2H$_2$O | 2 VTMO | 0.1 | 0.1 | 0.91 | 69 | 8 | 60 | 85 | 62 |
| 19 | HDPE S1 - 5.0 δ*** - 0.955 | 1.0 CaSO$_4$.2H$_2$O | 2 VTMO | 0.1 | 0.1 | 0.55 | 8 | 5 | 10 | 171 | 23 |
| 20 | HDPE S1 - 5.0 δ*** - 0.955 | 2.0 CaSO$_4$.2H$_2$O | 2 VTMO | 0.1 | 0.1 | 0.64 | 5 | 8 | 10 | 201 | 34 |
| 21 | LDPE, S1 - 0.5 C**** - 2.5% | 1.0 CaSO$_4$.2H$_2$O | 2 VTMO | 0.1 | 0.1 | 0.90 | 20 | 5 | 10 | 57 | 57 |
| 22 | LDPE, S1 - 0.5 C**** - 2.5% | 2.0 CaSO$_4$.2H$_2$O | 2 VTMO | 0.1 | 0.1 | 0.86 | 32 | 6 | 23 | 61 | 74 |

TABLE VI

|    | Quality | Foaming agent (%) | Silane (%) | DCP (%) | DBTL (%) | Note | Density (g/cm$^3$) | | Degree of cross-linking (%) | |
|----|---------|-------------------|------------|---------|----------|------|--------------------|---|------------------------------|---|
| 23 | LDPE, S1 - 0.3 | 2.0 CaSO$_4$.2H$_2$O | 2 VTMO | 0.1 | 0.1 | T - 160° C. | 0.52$^a$ | 0.48$^b$ | 43$^a$ | 45$^b$ |
| 24 | " | 2.0 CaSO$_4$.2H$_2$O | 2 VTMO | 0.1 | 0.1 | T - 210° C. | 0.65 | 0.40 | 54 | 54 |
| 25 | LDPE, S1 - 0.2 | 1.5 CaSO$_4$.2H$_2$O | 1 VTMO | 0.1 | 0.1 | T - 160° C. V - 30 min$^{-1}$ | 0.66 | 0.50 | 11 | 11 |
| 26 | " | 1.5 CaSO$_4$.2H$_2$O | 1 VTMO | 0.1 | 0.1 | T - 160° C. V - 40 min$^{-1}$ | 0.75 | 0.47 | 22 | 24 |
| 27 | " | 1.5 CaSO$_4$.2H$_2$O | 1 VTMO | 0.1 | 0.1 | T - 160° C. V - 23 min$^{-1}$ | 0.67 | 0.48 | 10 | 13 |
| 28 | " | 2.0 CaSO$_4$.2H$_2$O | 2 VTMO | 0.1 | 0.2 | T - 160° C. V - 40 min$^{-1}$ | Powder | | 74 | — |
| 29 | " | 2.0 CaSO$_4$.2H$_2$O | 2 VTMO | 0.1 | 0.2 | T - 160° C. V - 75 min$^{-1}$ | 0.48 | 0.45 | 48 | 54 |

*S1 - Melt index (g/10 min), 190° C./2, 16 kg
**VTMOEO - Vinyltrimethoxysilane
*****δ - Density (g/cm$^3$)
****C - Carbon black
$^a$in non-boiling water
$^b$in boiling water

I claim:

1. A method of producing a foamed polyolefin resin cross-linked with silane, comprising the steps of
    forming a mixture of polyolefin, a silane hydrolyzable with water, and a foaming agent consisting essentially of about 0.1-5% water and up to about 20% of a water carrier substance, said percentages being based on the polyolefin, and
    extruding the thus-formed mixture, whereby polyolefin cross-linked with silane is formed and is foamed solely by the action of the water which acts as the foaming agent.

2. The method of claim 1, wherein the water carrier substance is selected from the group consisting of a substance containing crystal water, a water-absorbing substance, and a water-solving substance miscible with the polyolefin, and mixtures thereof.

3. The method of claim 2, wherein the substance containing crystal water is gypsum or aluminum oxide, the water absorbing substance is calcium chloride or silica, and the water-solving substance miscible with the polyolefin is selected from the group consisting of ethylene glycol, polyethylene glycol, propylene glycol, polypropylene glycol, and mixtures thereof.

4. The method of claim 1, wherein the mixture is formed by
    mixing a substance containing crystal water serving as the water carrier substance with the polyolefin at a temperature at which the water does not separate.

5. The method of claim 4, wherein the mixture is formed by
   forming a first mix of polyolefin with the silane,
   forming a second mix of polyolefin with the substance containing crystal water, and
   combining said first and second mixes.

6. The method of claim 1, wherein the mixture is formed such that the extended polyolefin contains about 0.1–10% $CaSO_4.2H_2O$, up to about 10% vinyltrimethoxy silane, up to about 5% of dicumylperoxide, and up to about 5% of dibutylstonnic dilaurate.

7. The method of claim 6, wherein the mixture is formed such that the extruded polyolefin contains about 0.5–3% of the $CaSO_4.2H_2O$, and 0.5–3% of the vinyltrimethoxy silanie, about 0.02–0.1% of the dicumylperoxide, and about 0.05–0.5% of the dibutylstannic dilaurate.

* * * * *